US009970529B2

(12) United States Patent
Grennvall

(10) Patent No.: US 9,970,529 B2
(45) Date of Patent: May 15, 2018

(54) SHIFT LEVER ASSEMBLY WITH ELECTRONIC DETECTION OF MODES OF TRANSMISSION

(71) Applicant: Kongsberg Automotive AB, Mullsjö (SE)

(72) Inventor: Andreas Grennvall, Jönköping (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 252 days.

(21) Appl. No.: 14/917,716

(22) PCT Filed: Sep. 9, 2013

(86) PCT No.: PCT/EP2013/068638
§ 371 (c)(1),
(2) Date: Mar. 9, 2016

(87) PCT Pub. No.: WO2015/032454
PCT Pub. Date: Mar. 12, 2015

(65) Prior Publication Data
US 2016/0215875 A1 Jul. 28, 2016

(51) Int. Cl.
*B60K 20/00* (2006.01)
*F16H 59/04* (2006.01)
(Continued)

(52) U.S. Cl.
CPC ....... *F16H 59/0204* (2013.01); *F16H 59/105* (2013.01); *F16H 61/24* (2013.01); *F16H 2059/026* (2013.01); *F16H 2061/247* (2013.01)

(58) Field of Classification Search
CPC .... F16H 59/0204; F16H 59/105; F16H 61/24; F16H 2059/026; F16H 2061/247
See application file for complete search history.

(56) References Cited

U.S. PATENT DOCUMENTS 7,614,319 B2 11/2009 Hermansson et al.
2002/0056334 A1 5/2002 Fujinuma
(Continued)

FOREIGN PATENT DOCUMENTS

JP H 05-118414 A 5/1993
WO WO 2011/061223 A1 5/2011

OTHER PUBLICATIONS

International Search Report for Application No. PCT/EP2013/068638 dated Jul. 16, 2014, 4 pages.
(Continued)

*Primary Examiner* — Jake Cook
(74) *Attorney, Agent, or Firm* — Howard & Howard Attorneys PLLC

(57) ABSTRACT

The present invention relates to a shift lever assembly for controlling the transmission of a vehicle, said shift lever assembly (1) comprising a housing (2) comprising a detent track (290) having a number of seats, a shift lever (31) arranged to pivot about a first axis (α), located within said housing (2), along a first gate (73) between a number of positions corresponding to different modes of transmission, the positions of the shift lever (31) corresponding to one position each along said detent track (290), a sensor assembly (6) for detecting the position of the shift lever (31) in relation to said detent track (290), said sensor assembly (6) comprising a first member (63) connected to and jointly displaceable with said shift lever (31) along said first gate (73), and a second member (69) mounted on a carrier body (60), said first member (63) and said second member (69) being arranged to interact for detecting the position of the shift lever (31) in relation to said detent track (290), wherein said carrier body (60) is displaceable in at least one direction within said housing (2) in a first stage of assembly and is arranged to be fixed in said direction at a predetermined
(Continued)

Figure 1:
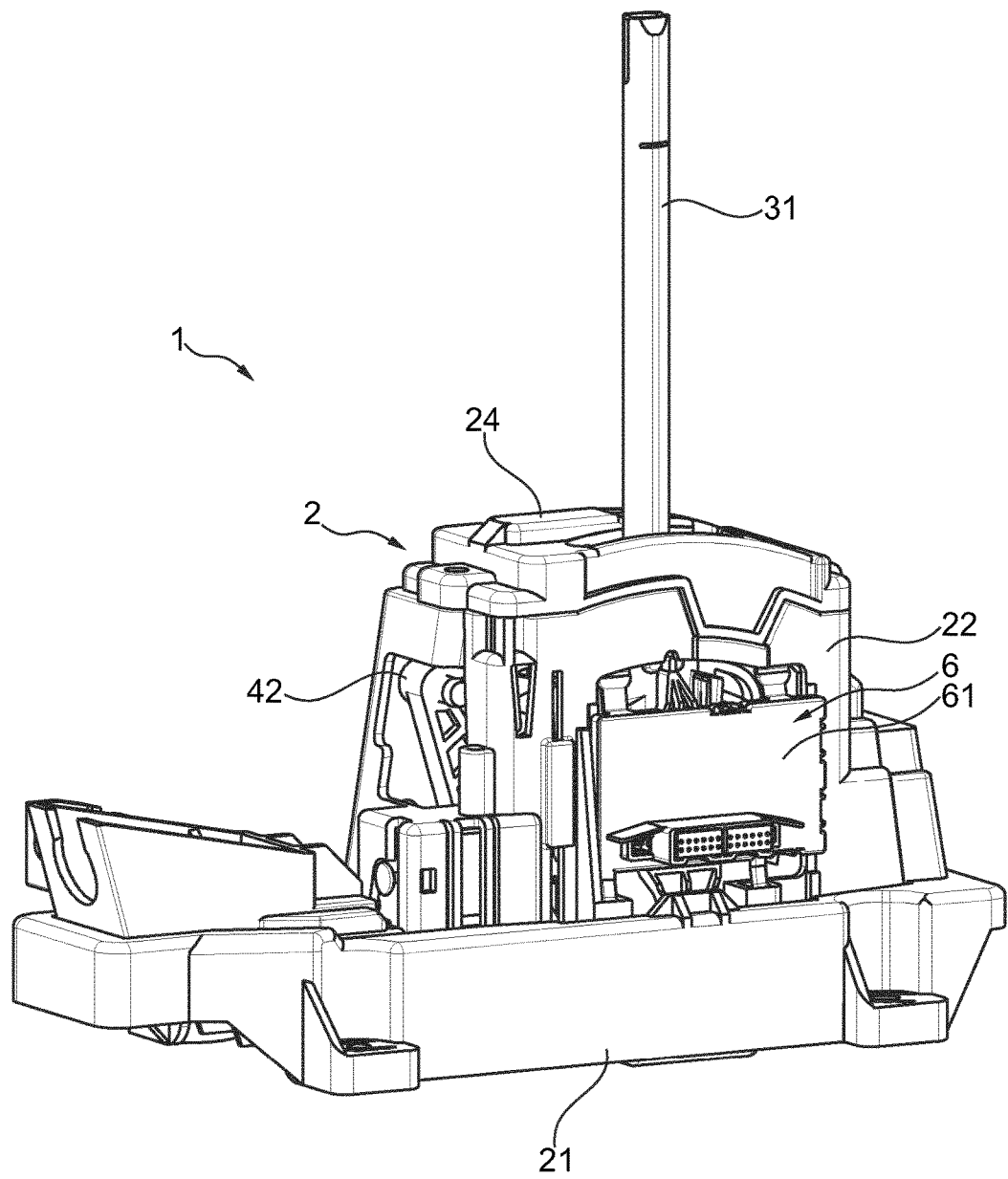

position in relation to said detent track (290) in a second stage of assembly.

18 Claims, 8 Drawing Sheets

(51) Int. Cl.
*F16H 59/02* (2006.01)
*F16H 59/10* (2006.01)
F16H 61/24 (2006.01)

(56) References Cited

U.S. PATENT DOCUMENTS

| | | | |
|---|---|---|---|
| 2008/0098845 A1* | 5/2008 | Meyer | F16H 59/0204 74/473.26 |
| 2010/0175494 A1 | 7/2010 | Schober et al. | |
| 2012/0187940 A1 | 7/2012 | Uhlenbruck | |

OTHER PUBLICATIONS

English language abstract and computer-generated English language translation for JPH 05-118414 extracted from espacenet.com database on Mar. 8, 2016, 8 pages.

English language abstract for WO 2011/061223 extracted from espacenet.com database on Mar. 8, 2016, 2 pages.

* cited by examiner

SHIFT LEVER ASSEMBLY WITH ELECTRONIC DETECTION OF MODES OF TRANSMISSION

The subject patent application claims priority to and all the benefits of International Patent Application No. PCT/EP2013/068638, filed on Sep. 9, 2013, the disclosure of which is incorporated herein by reference in its entirety.

TECHNICAL FIELD

The present invention relates to a shift lever assembly for controlling the transmission of a vehicle, said shift lever assembly comprising
  a housing comprising a detent track having a number of seats,
  a shift lever arranged to pivot about a first axis, located within said housing, along a first gate between a number of positions corresponding to different modes of transmission, the positions of the shift lever corresponding to one seat each along said detent track,
  a sensor assembly for detecting the position of the shift lever in relation to said detent track, said sensor assembly comprising a first member connected to and jointly displaceable with said shift lever along said first gate, and a second member mounted on a carrier body, said first member and said second members being arranged to interact for detecting the position of the shift lever in relation to said detent track.

The invention also relates to a method for assembling a shift lever assembly.

BACKGROUND

In modern vehicles such as cars, a shift gear or mode of transmission is generally selected by the driver pivoting a shift lever along a gate in a shift lever assembly. The position of the shift lever is then detected and a shift command signal corresponding to the selected position, i.e. the selected mode of transmission, is sent to the transmission of the vehicle for effectuating the shift command.

When detecting the position of the shift lever, it is important that the components involved are reliable and robust so that they can perform well during long stretches of time, but also that their performance is maintained on a high level throughout the life of the shift lever assembly to prevent mistakes that would decrease the performance of the engine or cause damage to the vehicle.

Generally, it is desired to use an electronic detection of the position of the shift lever, due to the efficiency and compact design of the components required. Two such technologies are disclosed by U.S. Pat. No. 7,614,319 and US 2010/0175494.

Often, however, it is difficult to achieve the desired results over long stretches of time using cost efficient components, and due to the tolerances of manufacturing and assembling the shift lever assembly, the risk for mistakes in detecting a position of the shift lever increases. It would therefore be desirable to achieve a reliable and robust shift lever assembly with electronic detection of positions of the shift lever, while at the same time achieving cost efficiency and minimize the risk for mistakes.

DISCLOSURE OF THE INVENTION

The object of the present invention is to eliminate or at least to minimize the problems described above. This is achieved through a shift lever assembly and a method for assembling a shift lever assembly according to the appended independent claims. Thereby, an improved shift lever assembly can be created, where the detection of a position of a shift lever is performed in a more accurate and reliable manner, thanks to a displaceable mounting of a second member and the subsequent fixing of the second member into a predetermined position in relation to a detent track.

In one embodiment of the invention, a carrier body holding the second member is arranged to pivot about the same axis as the shift lever. Thereby, an adjustment of the carrier body and thus of the second member in relation to the shift lever can be facilitated and improved.

In one embodiment of the invention, a housing comprises a first interaction portion and the carrier body comprises a second interaction portion, said first and second interaction portions being arranged to interact to fixate the carrier body in said predetermined position in relation to the detent track. Thereby, the accuracy of the detection of a position of the shift lever can be further improved.

In one embodiment of the invention, the carrier body comprises biasing means for biasing the carrier body towards a first member, and preferably said biasing means comprise at least one spring. Thereby, the carrier body is held towards the first member so that the distance between the first and second member is kept as small as possible to further improve the accuracy in the detection of a position.

The carrier body may also be arranged to abut a first member carrier and the sensor assembly comprise a friction reducing portion arranged between the first member carrier and the carrier body. Thereby, the first member carrier can move in relation to the carrier body while the wear and tear to the components is held low, to increase the durability and life of the shift lever assembly.

In one embodiment, the first member comprises a magnet and the second member comprises at least one sensor, preferably at least one sensor for each position of the shift lever, for detecting the position of the magnet. Thereby, a reliable and cost efficient detection of a position can be achieved, while maintaining a reliable operation of the first and second members.

The housing may comprise a lid to which the detent track is connected. Thereby, a compact and convenient design of a shift lever unit can be achieved and the interaction with the first and second members made efficient and reliable.

Other advantages of the present invention will become readily apparent to the person skilled in the art in view of the detailed description below.

DRAWINGS

Figure 2:
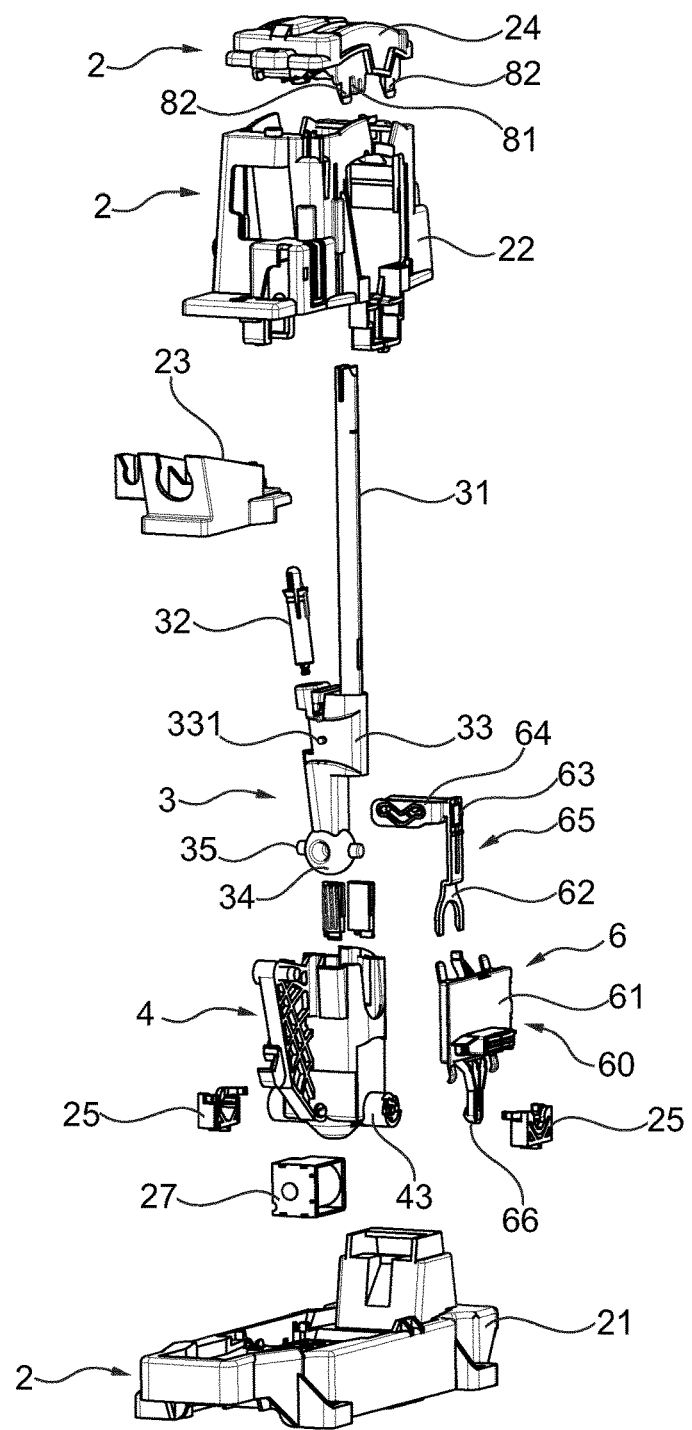
Figure 3:
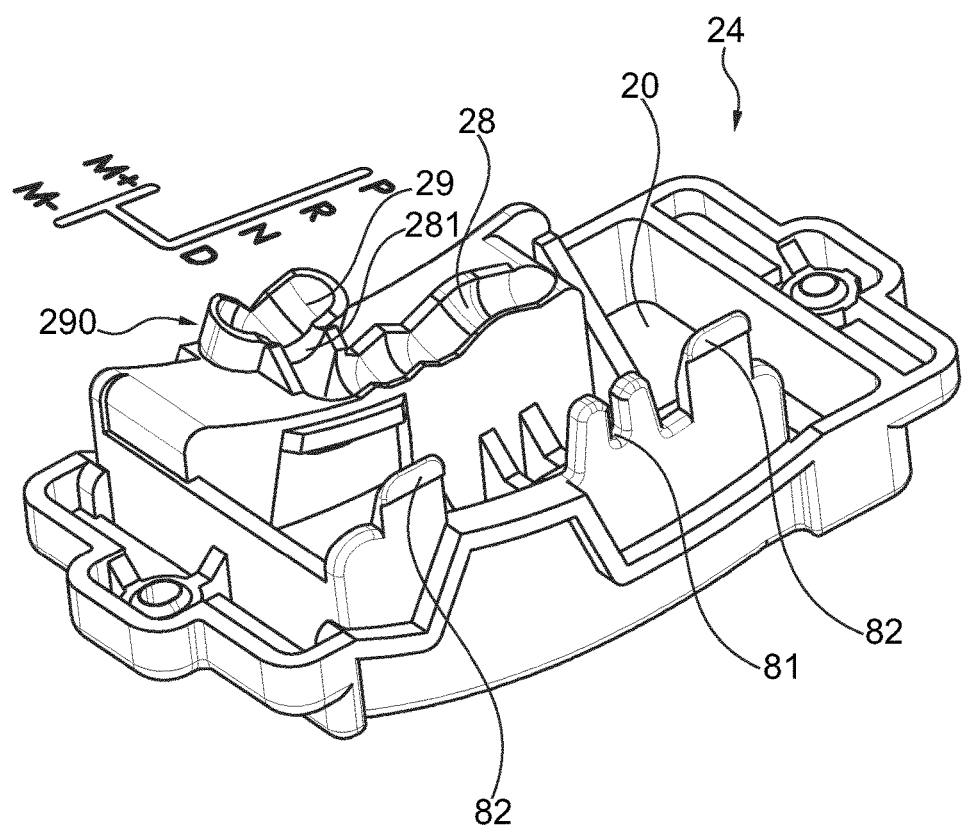
Figure 4:
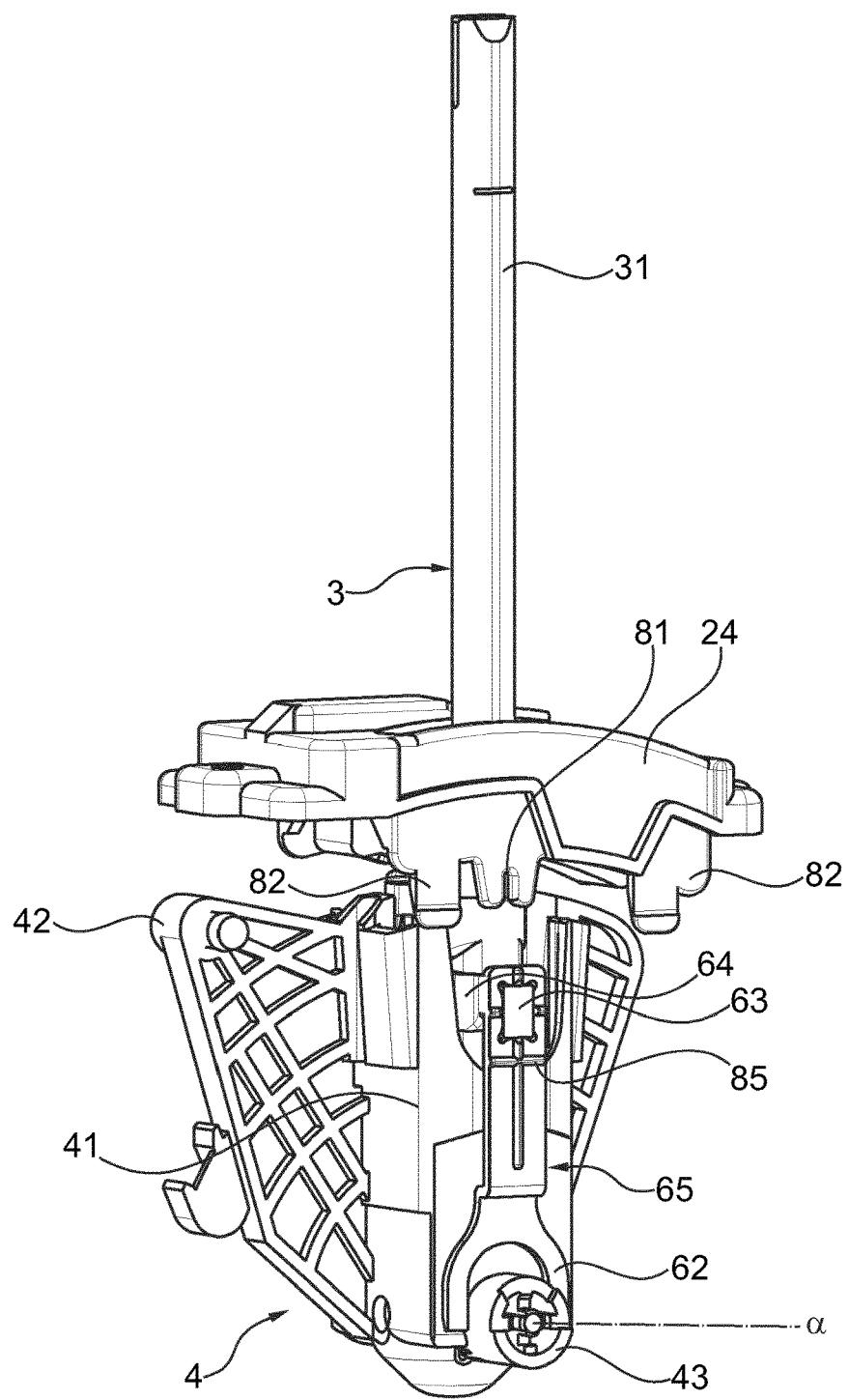
Figure 5:
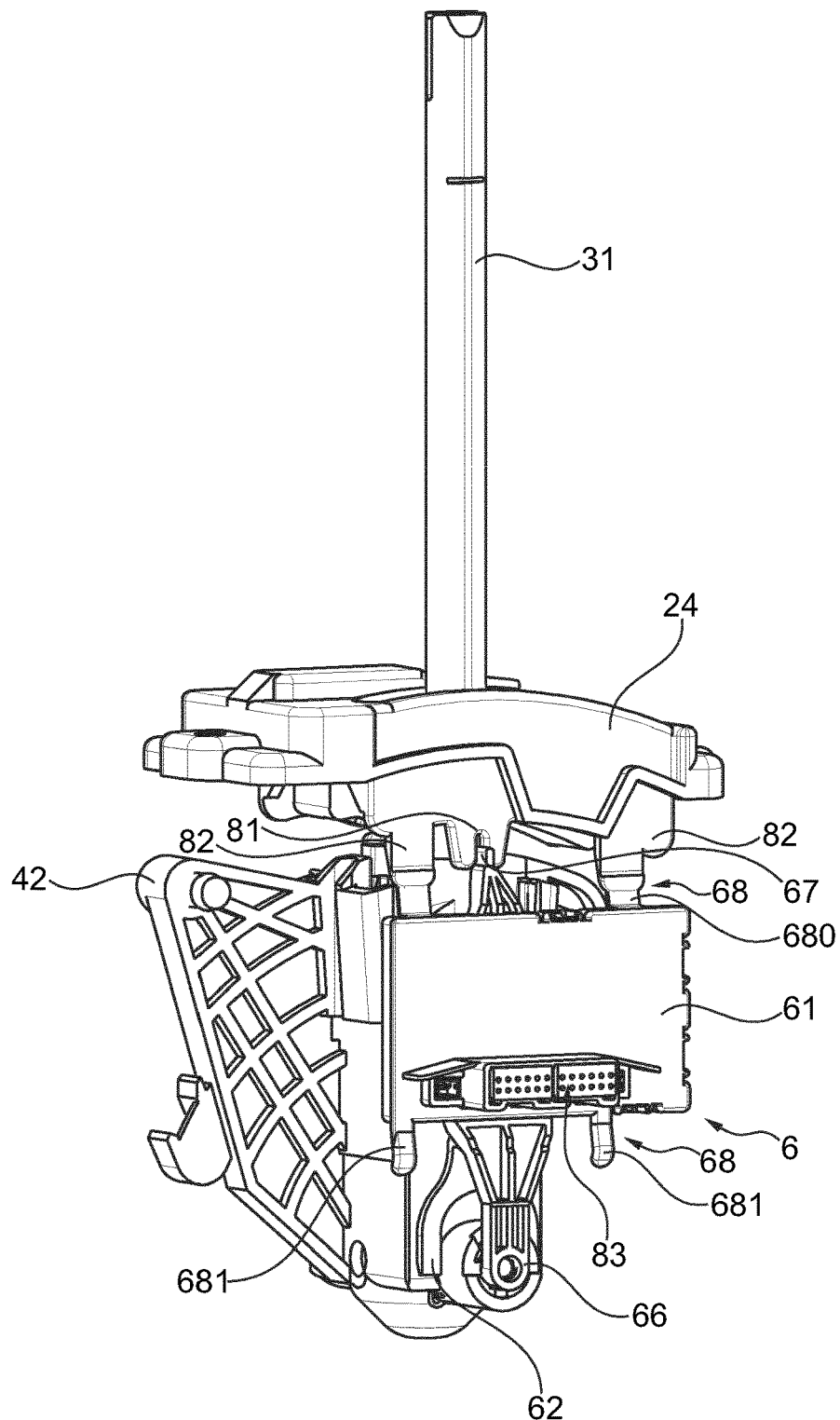
Figures 6A, 6B:
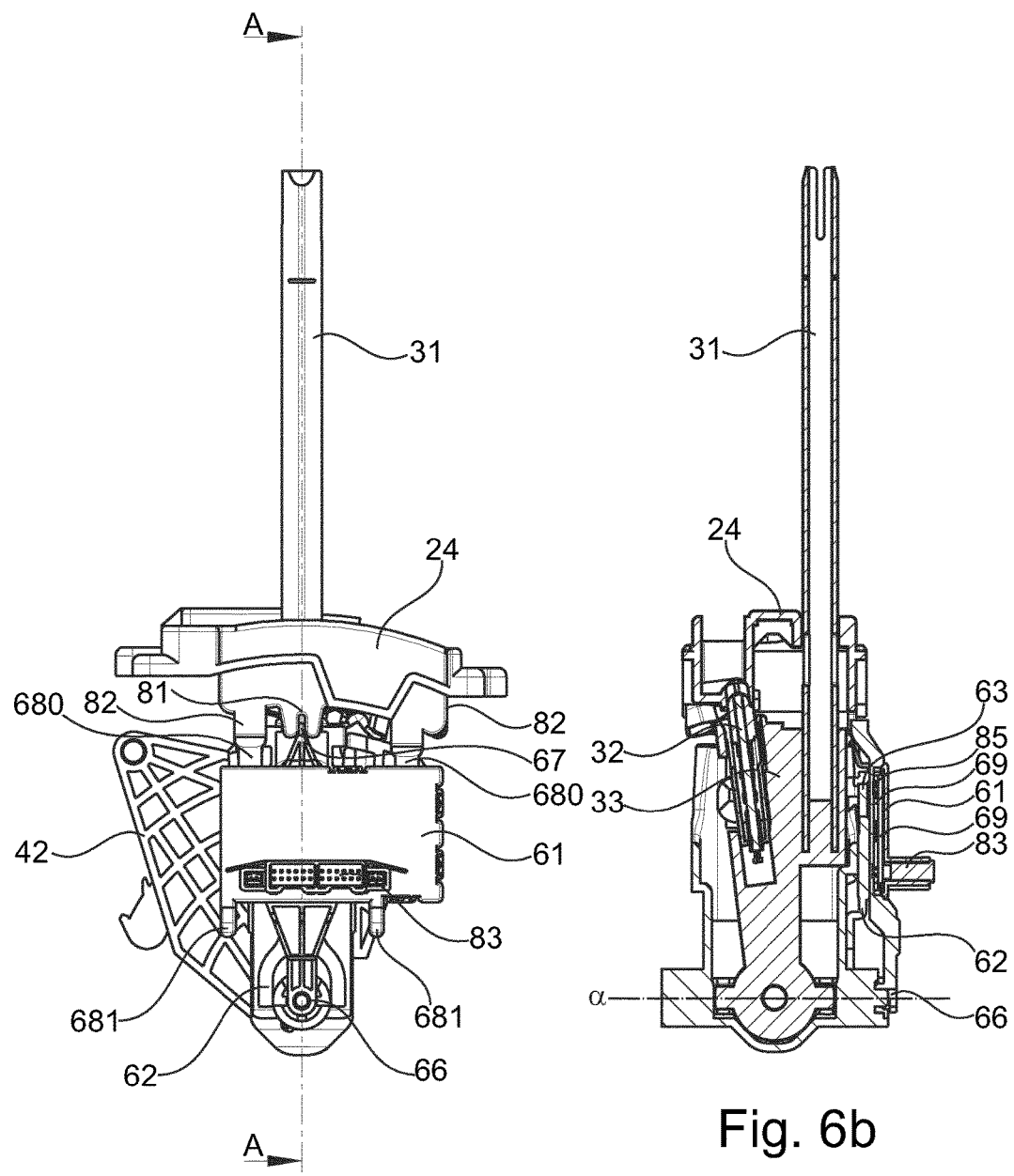
Figure 7:
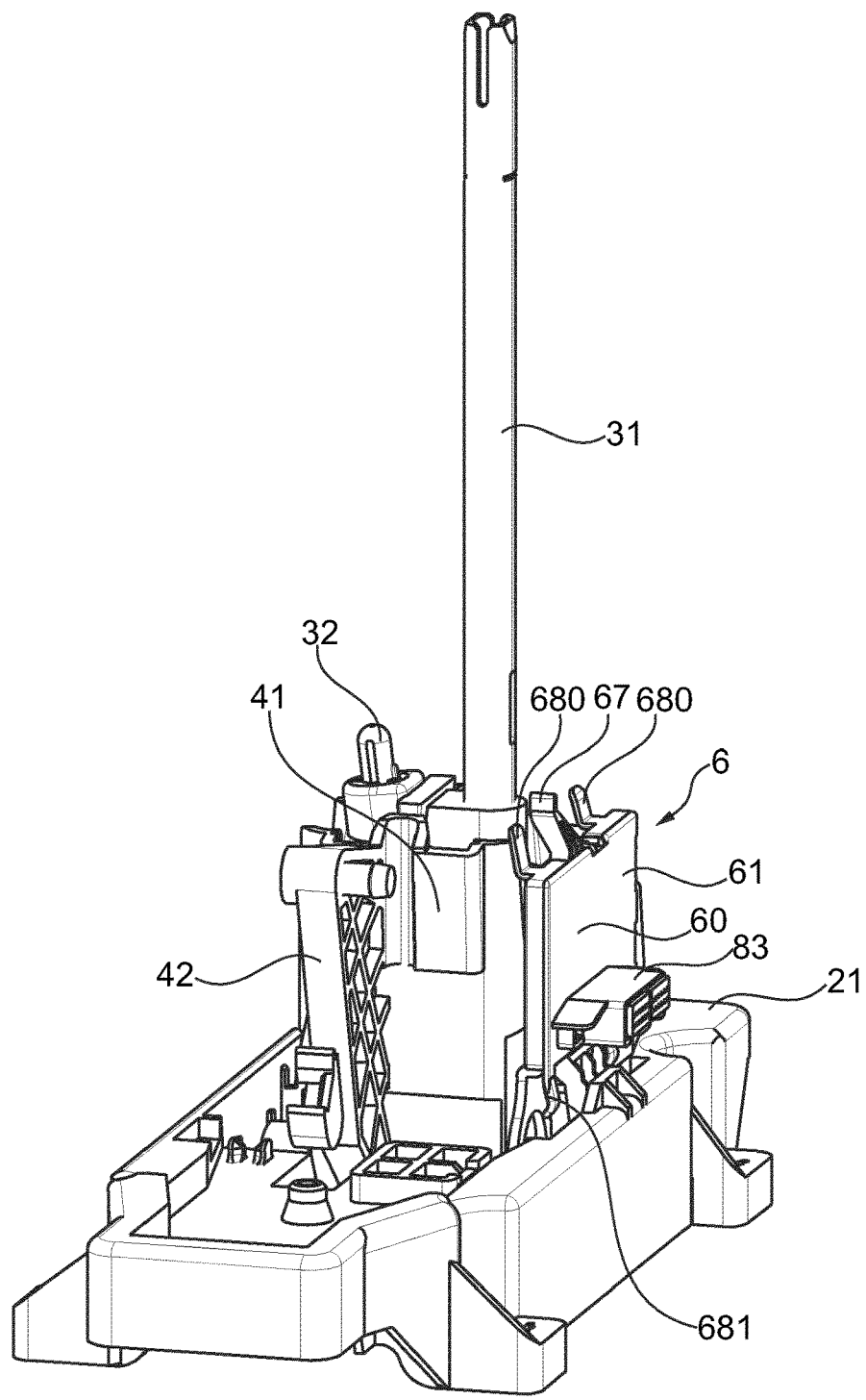
Figure 8:
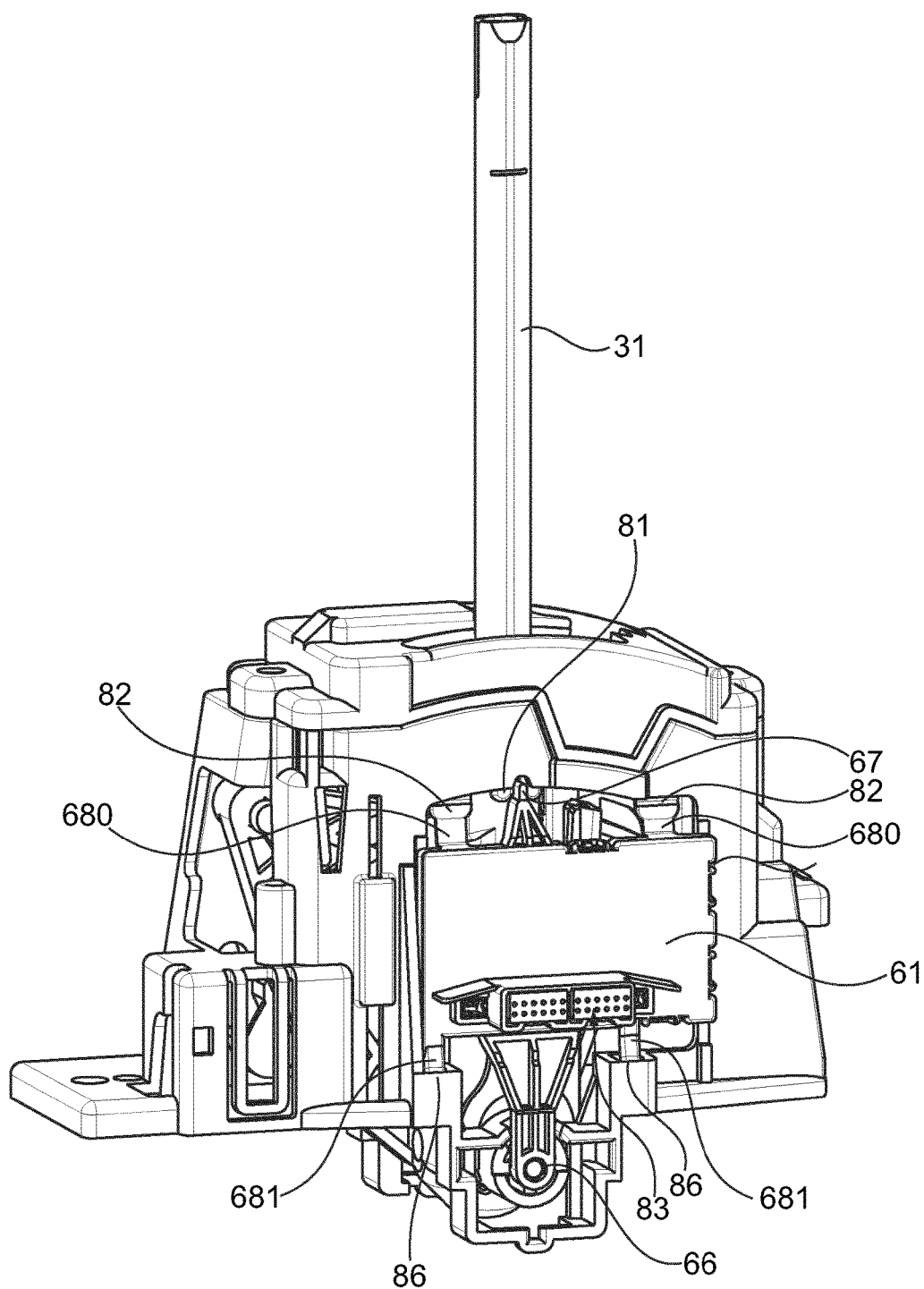

The invention will now be described in more detail with reference to the appended drawings, wherein:

FIG. 1 discloses a perspective view of a shift lever assembly according to a preferred embodiment of the invention;

FIG. 2 discloses an exploded view of the shift lever assembly of FIG. 1;

FIG. 3 discloses a perspective view from beneath of a lid of a housing with a detent track together with a shift lever pattern for the shift lever assembly;

FIG. 4 discloses a perspective view of a first member of a sensor assembly mounted on a shift lever unit enclosed by a cable unit and extending through the lid of the shift lever assembly;

FIG. 5 discloses a perspective view of the components shown by FIG. 3 and with a second member of the sensor assembly mounted on a carrier body attached to said components;

FIG. 6a discloses a planar view of the components shown by FIG. 5;

FIG. 6b discloses a cross-sectional view along A-A of FIG. 6a;

FIG. 7 discloses a perspective view of the shift lever assembly of FIG. 1 without the housing;

FIG. 8 discloses a perspective view of the shift lever assembly of FIGS. 1 and 7 with the housing but without a base

DETAILED DESCRIPTION

FIGS. 1 and 2 disclose a preferred embodiment of a shift lever assembly 1 with a housing 2, a shift lever unit 3, cable unit 4 and sensor assembly 6 that when mounted form an assembled shift lever assembly 1 as shown by FIG. 1. The shift lever unit 3 comprises a shift lever 31 and detent plunger 32 that are mounted in an overmold 33 extending towards a ball 34 of a ball joint with pegs 35. Said shift lever unit 3 is mounted in the cable unit 4 so that the ball 34 rests at a seat of the cable unit 4 and is arranged to pivot about a first axis $\alpha$ (see FIG. 6b). The shift lever 31 is arranged to pivot between a number of positions in a first gate, each position corresponding to a mode of transmission. Furthermore, the cable unit 4 is held by a base 21 of the housing 2 by means of receiving portions 25 that allow the cable unit 4 to pivot. Also provided is the sensor assembly 6 having a first member carrier 65, connected to the shift lever 31, and a carrier body 60 that is displaceably mounted. The housing 2 further comprises a housing body 22 and a lid 24 with a first interaction portion 81 and upper sensor assembly attachments 82 for attaching the carrier body 60 as will be described in more detail further below. The lid 24 comprises an elongated opening 20 through which the shift lever 31 is arranged to extend and along which the positions corresponding to modes of transmission are located. Also shown in FIG. 2 are a cable bracket 23 and a solenoid 27.

The housing 2 also comprises a detent track 290 (see FIG. 3), in this preferred embodiment located in the lid 24, for receiving the detent plunger 32 of the shift lever unit 3. It is to be noted, however, that the detent track 290 can be located in another part of the housing 2 with only minor modifications as to the design of the shift lever unit 3. The detent track 290 comprises a number of seats defining positions corresponding to different modes of transmission such as forward drive gears, for instance, and the detent plunger 32 and shift lever 31 are at a fixed distance to each other so that each position for the shift lever 31 corresponds to a seat for the detent plunger 32 along the detent track 290. In this embodiment, the detent track 290 further comprises a first detent track 29 and a second detent track 28.

FIG. 3 shows the lid 24 of the housing 2 from beneath, with the elongated opening 20 and the detent track 290. In this preferred embodiment, the shift lever assembly 1 can alternate between an automatic mode of transmission, in which the driver can pivot the shift lever 31 to move the detent plunger along a second detent track 28 in a second gate to select an automatic mode (Park, Reverse, Neutral or Drive, as shown by an exemplary shift pattern next to the detent track), and a manual mode of transmission, in which the driver can pivot the shift lever 31 to move the detent plunger along the first detent track 29 in the first gate to choose manually between forward drive gears (shown as M+ and M− in the exemplary shift pattern). The seats along the detent track 290 can be stable or unstable seats, where a stable seat is defined as a position in which the shift lever 31 can remain after being placed there by a driver, whereas an unstable seat is defined as a position in which the shift lever 31 cannot remain on its own, but will progress to an adjacent stable position and rest there. As an example, the M+ and M− positions defining forward drive gears in the exemplary shift pattern of FIG. 3 are unstable seats. When the driver places the shift lever 31 in the M+ position, for instance, the shift lever 31 reverts to a stable seat between the M+ and M− positions. This is achieved by inclining the surface of the first detent track 29 so that the detent plunger 32 slides towards the stable seat. For a stable seat, the detent track has an indentation in which the detent plunger 32 can rest.

To alternate between the automatic and manual modes, the shift lever 31 and detent plunger 32 are pivoted in a direction transversal to the first axis $\alpha$ so that the detent plunger 32 is moved along a detent plunger passage 281 between the first and second detent tracks 29, 28. In this embodiment, only the detection of the position of the shift lever 31 and as a consequence of this the detection of the seat of the detent plunger 32 along the first detent track 29, corresponding to manual modes of transmission, is performed by the sensor assembly 6, but it is to be noted that it would be equally possible to detect only automatic modes of transmission or both automatic and manual modes by means of the sensor assembly 6 with only minor modifications. What is said below with regards to the detection of the position of the shift lever 31 can therefore be applied to any or all of the positions of the shift lever, regardless of the mode of transmission used. It is also to be noted that the cable unit 4, which in this embodiment is used for detecting a position of the shift lever in the second gate, can be replaced with any other suitable component for performing the same function or can be omitted altogether if the detection is performed by the sensor assembly 6 for every position of the shift lever 31. If the cable unit is omitted, the shift lever unit 3 could be modified slightly and be mounted directly in the receiving portions 25 as will be readily understood by the person skilled in the art.

Also shown in FIG. 3 is the first interaction portion 81 that serves as a rotation stop to prevent a displacement of the carrier body 60 of the sensor assembly 6 through interaction with a second interaction portion 67 of said carrier body 60. When assembled, the carrier body 60 is thus locked into place by this interaction so that the carrier body 60 is fixed at a predetermined position in relation to the lid 24 and thereby to the detent track 290. This has the advantage that the detection of a position of the shift lever 31 and thereby of the detent plunger 32 in relation to the detent track 290 can be performed with greater accuracy even if the different components of the shift lever assembly 1 have been manufactured with small deficiencies as to their size and shape. In this preferred embodiment, the first interaction portion 81 is a fork extending from the lid 24 towards the carrier body 60 and the second interaction portion 67 is an elongated portion arranged to interact by fitting into the fork and being fixedly held to form a non-pivotable connection and prevent the carrier body 60 from pivoting about the first axis $\alpha$. In other embodiments, the first interaction portion 81 and the second interaction portion 67 can be made as other types of interlocking objects, as long as the purpose of interacting to form a non-pivotable connection and fix the carrier body 60 in a predetermined position in relation to the detent track 290 is achieved.

FIG. 4 shows the shift lever unit 3 mounted in the cable unit 4 so that the overmold 33 and the ball joint are encased by a cable unit body 41 on which is mounted a cable attachment 42 and lower bearing portions 43 forming a shaft 43 that in the mounted shift lever assembly 1 are mounted on the receiving portions 25. The lid 24 of the housing 2 is applied so that the shift lever 31 extends through the opening 20 as previously described, and a first member 63 of the sensor assembly 6 is mounted on the first member carrier 65. Said first member carrier 65 comprises a connecting track 64 that is connected to the overmold 33 of the shift lever unit 3 and thereby provides a connection to the shift lever 31, and also comprises a pivot holder 62 that holds the first member carrier 65 on a lower bearing portion 43 of the cable unit 4. Thereby, the first member carrier 65 is connected to and jointly displaceable with the shift lever unit 31 and can pivot about the same axis, namely the first axis α, as the shift lever 31 and the shift lever unit 3. Furthermore, the first member carrier 65 comprises a friction reducing portion 85 to reduce the friction when another component abuts the first member carrier 65, as will be described further below.

In FIG. 5, the components of FIG. 4 are shown with the addition of the carrier body 60 of the sensor assembly 6. Said carrier body 60 comprises a second member 69 (see FIG. 6b) that is arranged to interact with the first member 63 as will also be described further below, and also comprises a processing unit 61 for receiving input from the first member 63 or second member 69 and transmitting an output to the transmissions of the vehicle via an output connection 83. The carrier body 60 further comprises a holder 66 that is mounted on the cable unit 4 and the second interaction portion 67 for interaction with the first interaction portion 81 of the housing 2 to fixate the carrier body 60 in a predetermined position in relation to the detent track 290 in the housing 2. Also provided are biasing means 68 comprising upper biasing means 680 for attachment to the upper sensor assembly attachments 82 and lower biasing means 681 for attachment to the housing 2, preferably to the housing body 22. Thanks to the biasing means 68, the carrier body 60 of the sensor assembly 6 is biased towards the first member 63 to maintain a fixed distance between the first member 63 and the second member 69 and facilitate the detection of a position of the shift lever 31, as will be described in more detail further below. It may also be beneficial to keep said distance as small as possible. The biasing means 68 are preferably spring biased.

FIGS. 6a and 6b disclose the same components as FIG. 5 but also provides a cross-sectional view to show more clearly the parts of the sensor assembly 6. The first member 63 is shown adjacent to the overmold 33 where a lower part of the shift lever 31 is attached, and thanks to the first member carrier 65, said first member 63 is held firmly against the shift lever unit 3 and the shift lever 31, to be jointly displaceable with the shift lever 31 when the shift lever is in the first gate and is pivoted between positions in said first gate. Thanks to the pivot holder 62 at a lower end of the first member carrier 65 and the connecting track 64 in the upper end extending around the overmold 33, the first member 63 is held in place and allowed to pivot about the same first axis α as the shift lever 31. The second member 69 is mounted on the carrier body 60 adjacent to the first member 63 to be able to detect a position of the first member 63 and thereby of the shift lever 31.

In this preferred embodiment, the first member 63 is a magnet and the second member 69 at least one sensor such as a Hall effect sensor that serves to interact by detecting the position or movement of the magnet. For instance, the magnitude or direction of the magnetic field can be detected for determining a position or the change in the magnetic field can be detected to determine a movement of the magnet. In this preferred embodiment, the second member 69 comprises a plurality of sensors, at least one at each possible position of the shift lever 31 corresponding to a mode of transmission that is to be detected by the sensor assembly 6. The plurality of sensors are distributed along the carrier body 60 to match the positions of the first member 63 corresponding to each position of the shift lever as closely as possible. If desired, two or more sensors can be provided for each position, to increase the reliability of the sensor assembly 6 if one or more of the sensors are unable to function properly. In a simple, cost efficient and reliable embodiment, each sensor can detect the presence of a magnet within a specific distance and such presence is interpreted as a selected mode of transmission for the position designated to the sensor. In another embodiment, sensors are present only for some of the positions of the shift lever 31. The information regarding the selected mode is sent in the form of a signal from the sensor and is received by the processing unit 61, to be transformed to a shift command sent as output from the processing unit to the transmission. The processing unit is preferably mounted on a printed circuit board (PCB). The use of a magnet as the first member 63 is advantageous in that the detection can be made reliable and robust and can perform well for a long time, without requiring a power supply to the first member 63. Other types of sensors that are suitable for use with the invention include capacitive sensors, inductive sensors or potentiometers, but still other kinds of sensors can also be used.

In another embodiment, the first member 63 can comprise a sensor and the second member 69 at least one magnet. The position or movement of the shift lever 31 in relation to the magnet can then be detected in a manner similar to the interaction disclosed above. If a plurality of magnets is used, they can differ in the magnitude and/or direction of their magnetic fields to facilitate the identification of a magnet corresponding to a particular position of the shift lever 31 and the first member 63. The power supply for the sensor can be mounted along the overmold 33 and this embodiment is advantageous in that only one sensor is required and that sensor can be of a cost efficient and reliable kind. The use of a combination of magnet and sensor for the detection is also generally advantageous in that it is cost efficient and can endure wear and tear as well as the accumulation of dirt without suffering from a significantly lowered performance.

In yet another embodiment, the first member can be simply a marker of some kind and the second member 69 can comprise means for optical detection of the first member 63, such as a camera or optical sensor, for instance, and the second member 69 interacts with the first member 63 to determine a position of movement of said first member 63. The second member 69 cooperates with the processing unit 61 to interpret the optical data to determine a distance from the second member 69 to the first member 63 and also interpret this distance as a specific position of the shift lever 31. As will be readily apparent to the person skilled in the art, this embodiment could alternatively comprise a marker or the like as the second member 69 and the optical detection means as the first member 63.

In a further embodiment, the first member 63 and second member 69 form part of an electrical circuit where the second member 69 forms a series of switches, one of which is closed for each position of the first member 63. The first and second members 63, 69 interact to create a closed circuit and would in this embodiment have to be arranged to be connected to each other at each such position, and an advantage of this embodiment is that it is even more cost efficient than those described above and yet can be implemented in a reliable and robust manner.

All of the embodiments described above would be equally possible within the scope of the present invention and could be implemented with only minor modifications to the shift lever assembly 1, as will be readily understood by the person skilled in the art. Thus, any of the options disclosed above for the design of the sensor assembly 6 can be combined with the other features described with reference to the preferred embodiments described herein, as is readily understood by the person skilled in the art.

As mentioned further above, the carrier body 60 is biased towards the first member 63 by biasing means 68 to hold the carrier body 60 securely in place and to maintain the distance between the first member 63 and second member 69. Thanks to this, the interaction between the first and second member 63, 69 is more reliable and with smaller deviations due to tolerances of the manufacture or assembly of the components of the shift lever assembly 1. Preferably, the upper biasing means 680 and/or the lower biasing means 681 comprise springs.

The assembly of the shift lever assembly 1 will now be described in more detail, with reference to FIGS. 7 and 8, that disclose the shift lever unit 3, cable unit 4 and sensor assembly 6 mounted in the base 21 of the housing 2 without the housing body 22 and the lid 24, and in the housing body 22 and lid 24 but without the base 21, respectively. It is to be noted that the steps of the assembly can be performed in different order than that described below, but that the fixing of the carrier body 60 in relation to the detent track naturally takes place after providing said carrier body 60 to be displaceably arranged.

The shift lever unit 3 with the shift lever 31 and the detent plunger 32 is provided and the first member carrier 65 mounted on the overmold 33 of the shift lever unit 3 by connecting the connecting track 64 to a pair of overmold tabs 331, one on each side of the overmold 33, to hold the first member carrier 65 fixed against the shift lever unit 3. The shift lever unit 3 is then inserted into the cable unit 4 to allow the pivot holder 62 to rest against the lower bearing portions 43 and allow the first member carrier 65 to be jointly displaceable with the shift lever 31 as the latter pivots about the first axis α.

The housing body 22 is mounted on the shift lever unit 3 and the holder 66 of the carrier body 60 mounted on the lower bearing portions 43 of the cable unit 4. The carrier body 60 is displaceable in at least one direction in relation to the housing 2 with the housing body 22 so that the alignment of the carrier body 60 in relation to said housing 2 can be adjusted. This forms a first stage of assembly. Preferably, the carrier body 60 is arranged to pivot about an axis within said housing 2 to facilitate the adjustment of the carrier body 60 in relation to the housing 2, and more preferably the carrier body 60 is arranged to pivot about the same axis as the shift lever 31, namely the first axis α. Thus, the holder 66 of the carrier body 60 serves as a pivotable connection to the components inside the housing 2, in this embodiment to the shift lever unit 3 and the cable unit 4. The lower bearing portions 43 serve as a shaft 43 extending along the first axis α on which the holder 66 is arranged to pivot in one direction.

The lid 24 of the housing 2 comprising the detent track 290 is fastened and fixed onto the housing body 22 and the shift lever 31 extends through the opening 20, and the second interaction portion 67 of the carrier body 60 is inserted into the first interaction portion 81 to fixate the carrier body 60 in a predetermined position in said direction in relation to the housing 2, i.e. preferably to prevent the carrier body 60 from pivoting about the axis when the shift lever assembly 1 is in an assembled stage. This forms a second stage of assembly. Thereby, the distance from the carrier body 60 and thereby from the second member 69 to the detent track 290 of the lid 24 is fixed and the detection of a position of the shift lever 31 and thereby of the detent plunger 32 along the detent track 290 can be performed with increased precision in accordance with the present invention.

To further hold the carrier body 60 close to the first member 63, the upper biasing means 680 are mounted on the upper sensor assembly attachments 82 of the lid 24 and the lower biasing means 681 mounted on lower sensor assembly attachments 86 in the housing body 22. Thanks to the biasing means 68, the carrier body 60 is thus held at a fixed distance to the first member 63. During operation, the shift lever 31 and thereby also the first member 63 on the first member carrier 65 will pivot about the first axis α and thereby along the first gate, creating a movement of the first member carrier 65 in relation to the carrier body 60. The holder 66 can also be movable along the axis α, for instance along a peg mounted on the lower bearing portion 43. The biasing means 68 can be formed integrated with the carrier body 60 or integrated with the housing 2, or can be separate means adjoined to the carrier body 60 and the housing 2, or a combination of all of these options, and these biasing means 68 can be placed in different positions around the carrier body 60. Furthermore, the carrier body 60 can be an integrated unit or can comprise a number of different components joined together by any suitable means.

In order to reduce wear and tear if the carrier body 60 abuts the first member carrier 65, a friction reducing portion 85 is provided between them, in this preferred embodiment in the form of at least one rib or ridge on the first member carrier 65. Other designs would of course also be possible, for instance in the form of a coating of a material with low friction on the first member carrier 65, such as Teflon (polytetrafluoroethylene) for instance. Naturally, the friction reducing portion 85 could also be placed on the carrier body 60 or on both the first member carrier 65 and the carrier body 60.

After the carrier body 60 has been mounted in the housing 2 and fixated in relation to the detent track 290 and before detecting a position of the shift lever 31, the sensor assembly 6 is connected to the transmission of a vehicle by means of an electronic connection between the output connection 83 and the transmissions itself. The other components of the shift lever assembly 1, such as the base 21 with the receiving portions 25 and different components of the cable unit 4 can be mounted as desired during the process of assembling the shift lever assembly 1.

It is to be noted again that the cable unit 4 is in no means necessary for the present invention and if it is omitted altogether, the shift lever unit 3 itself can be equipped with lower bearing portions on which the pivot holder 62 and the holder 66 can be mounted.

The operation of the sensor assembly to detect a position of the shift lever 31 will now be described in more detail.

When a mode of transmission, such as a forward drive gear for instance, is to be selected, the shift lever is pivoted along the first gate to a position corresponding to the desired mode. Since the first member 63 is jointly displaceable with the shift lever 31 in the first gate, the first member 63 itself is displaced accordingly to a position corresponding to the position of the shift lever 31. The first member 63 and the second member 69 interact, as has been described above, to detect which position the shift lever 31 is in, and the processing unit 61 receives a signal from the first or second member 63, 69 corresponding to this position. Thereby, the position of the detent plunger 32 in relation to the detent track 290 has also been determined, and the processing unit transforms this information into a shift command signal that is transmitted by means of the output connection 83 which is operatively connected to the transmission of the vehicle to perform the change to the selected mode of transmission. In one embodiment, the processing unit 61 can thus perform the analysis of the signal from the first or second member 63, 69, but in another embodiment it would be equally possible that the processing unit 61 simply transmits the signal from the first or second member 63, 69 and that the analysis is performed by the transmission of the vehicle. In yet another embodiment, the processing unit 61 could be dispensed with altogether so that the signal from the first or second member 63, 69 is transmitted directly to the transmission for further analysis.

As long as the shift lever 31 and thereby the first member 63 remain in a given position, no new shift command signal is sent to the transmission, but every time the shift lever 31 is pivoted along the first gate to a new position, the first member 63 and second member 69 interact to detect this position and signals this to the processing unit 61.

Another advantage of the present invention is that the fixed distance between the first member 63 and the second member 69 is maintained even in situations where the shift lever 31 is subjected to excessive force, for instance when the driver pushes the shift lever 31 too far along the gate so that it presses against the lid 24 at an end of the gate. If the force is large, the lid 24 itself may move slightly in response to the pressure, but thanks to the fixed placement of the carrier body 60 in relation to the lid 24, a resulting movement of the second member 69 will occur, keeping the distance between the first member 63 and the second member 69 at the desired distance and thereby maintaining a contact between them.

If the shift lever assembly 1 comprises a second gate where positions of the shift lever 31, and thereby modes of transmission, are detected by another component than the sensor assembly 6, such as the cable unit 4 for instance, the first member 63 can be displaced in relation to the shift lever 31 upon a movement of the shift lever 31 to said second gate. The overmold tabs 331 move along the connecting track 64, for instance by a pivoting movement of the shift lever 31 about a second axis, so that the first member carrier 65 is displaced and the proximity of the first member 63 to the second member 69 is decreased. In this preferred embodiment, the connecting track 64 is V-shaped, allowing the first member 63 to be elevated in relation to the second member 69. The sensor assembly 6 itself can thereby be disconnected and remain in a rest state until the shift lever 31 is pivoted back to the position where the connecting track 64 can once again connect the first member 63 to the second member 69 to resume the operation as described above, or alternatively the transmission of the vehicle itself can be arranged to disregard signals from the sensor assembly 6 while the cable unit 4 is in operation to detect a mode of transmission. In another embodiment, the second member 69 can comprise a second set of sensors, corresponding to the elevated position of the first member, to allow detection through the sensor assembly 6 also when the shift lever unit is in the second gate. Other variations are of course also possible within the scope of the claims, as will be readily understood by the person skilled in the art.

The invention is not to be seen as limited by the embodiments described above, but can be varied within the scope of the appended claims, as will also be readily understood by the skilled person. For instance, the first member can be integrated with the shift lever or the shift lever unit and other designs and modes of operations of the sensor assembly can be used with the invention.

The invention claimed is:

1. A shift lever assembly for controlling the transmission of a vehicle, said shift lever assembly comprising:
    a housing comprising a detent track having a number of seats with each seat defining a position corresponding to a different mode of the transmission and said housing defining a first gate;
    a shift lever defining a first axis with said shift lever supported by said housing and arranged to pivot about said first axis along said first gate between said positions corresponding to the different modes of the transmission; and
    a sensor assembly for detecting the position of the shift lever in relation to said detent track, said sensor assembly comprising a first member connected to said shift lever and jointly displaceable with said shift lever along said first gate, a carrier body, and a second member mounted on said carrier body, with said first member and said second member being arranged to interact for detecting the position of said shift lever in relation to said detent track;
    wherein said carrier body is pivotable about said first axis in a first stage of assembly such that the carrier body is displaceable relative to said housing, and said carrier body is fixed to the housing in a predetermined position in relation to said detent track in a second stage of assembly to prevent displacement of the carrier body relative to said housing.

2. A shift lever assembly according to claim 1, wherein said carrier body comprises a holder mounted on a shaft along said first axis for enabling said carrier body to pivot about said first axis.

3. A shift lever assembly according to claim 1, wherein said housing comprises a first interaction portion and said carrier body comprises a second interaction portion, said first and second interaction portions being arranged to interact to fixate said carrier body in said predetermined position in relation to said detent track.

4. A shift lever assembly according to claim 3, wherein said first interaction portion is a fork and said second interaction portion is an elongated portion of said carrier body arranged to fit into said fork to fixate said carrier body in said predetermined position.

5. A shift lever assembly according to claim 1, wherein said sensor assembly further has a first member carrier connected to said shift lever, and said first member is mounted on said first member carrier.

6. A shift lever assembly according to claim 1, wherein said carrier body comprises a biasing means for biasing said carrier body towards said first member.

7. A shift lever assembly according to claim 5, wherein said carrier body is arranged to abut said first member carrier and said sensor assembly comprises a friction reducing portion arranged between said first member carrier and said carrier body.

8. A shift lever assembly according to claim 7, wherein said friction reducing portion comprises at least one rib.

9. A shift lever assembly according to claim 1, wherein said first member comprises a magnet and said second member comprises at least one sensor for detecting a position of said magnet.

10. A shift lever assembly according to claim 9, wherein said second member comprises at least one sensor for each position of the shift lever corresponding to a different mode of the transmission.

11. A shift lever assembly according to claim 1, wherein said housing comprises a lid, and said detent track is fixed to said lid.

12. A method for assembling a shift lever assembly, comprising the steps of:
providing a housing defining a first axis and comprising a detent track having a number of seats with each seat defining a position corresponding to a different mode of a transmission and the detent track defining a first gate;
providing a shift lever supported by the housing and arranged to pivot about the first axis along the first gate between the positions corresponding to the different modes of the transmission;
providing a sensor assembly for detecting the position of the shift lever in relation to the detent track with the sensor assembly comprising a first member, a carrier body, and a second member mounted on the carrier body;
connecting the first member of the sensor assembly to the shift lever such that the shift lever and the first member are jointly displaceable along the first gate, wherein the sensor assembly is arranged to detect the position of the shift lever in relation to the detent track by an interaction of the first member and the second member;
connecting the carrier body of the sensor assembly to the housing in a first stage of assembly with the carrier body being displaceable in at least one direction relative to the housing such that the carrier body is arranged to pivot about the first axis;
fixing the carrier body in a predetermined position in relation to the detent track in a second stage of assembly to prevent displacement of the carrier body relative to the housing; and
pivoting the carrier body about the first axis before fixing the carrier body in relation to the detent track.

13. A method according to claim 12, further comprising the step of biasing the carrier body towards the first member.

14. A method according to claim 12, wherein the housing comprises a first interaction portion and the carrier body comprises a second interaction portion and the step of fixing the carrier body is further defined as fixing the carrier body in the predetermined position in relation to the detent track by an interaction of the first interaction portion and the second interaction portion.

15. A shift lever assembly according to claim 6, wherein said biasing means comprises at least one spring.

16. A shift lever assembly according to claim 3, wherein said housing includes a lid including said detent track and said lid defining said first interaction portion for interaction with said second interaction portion to fixate said carrier body at said predetermined position in relation to said lid.

17. A shift lever assembly according to claim 5 wherein said first member carrier holds said first member against said shift lever such that said first member is pivotable about said first axis with said shift lever.

18. A shift lever assembly according to claim 1, wherein said first member is a marker and said second member is an optical sensor for detecting a position of said marker.

* * * * *